United States Patent [19]

Reneau

[11] 4,068,492
[45] Jan. 17, 1978

[54] UNDERWATER PIPELINE COUPLING APPARATUS

[76] Inventor: Bobby J. Reneau, P.O. Box 14, Bellaire, Tex. 77401

[21] Appl. No.: 711,991

[22] Filed: Aug. 5, 1976

[51] Int. Cl.² ............................................. F16L 1/00
[52] U.S. Cl. ....................................... 61/110; 29/237; 285/24
[58] Field of Search ........................ 61/111, 112, 110; 29/237, 407; 285/24; 214/1 P

[56] References Cited

U.S. PATENT DOCUMENTS

| 436,915 | 9/1890 | Fischer | 61/111 X |
|---|---|---|---|
| 3,267,682 | 8/1966 | Robley | 61/111 |
| 3,717,920 | 2/1973 | Oliver et al. | 61/111 X |

Primary Examiner—Jacob Shapiro
Attorney, Agent, or Firm—Donald Gunn

[57] ABSTRACT

A new and improved pipeline coupling apparatus is disclosed. This apparatus incorporates an elongate support member having the form of an I-beam where the flanges of the I-beam serve as a guide for a traveling carriage. The traveling carriage is urged along the I-beam by means of a hydraulic cylinder and piston rod. The traveling carriage centers a pipe. It positions the coupling and forces the pipe into the coupling. The coupling itself is supported for sliding movement by a free moving carriage beneath the I-beam.

10 Claims, 5 Drawing Figures

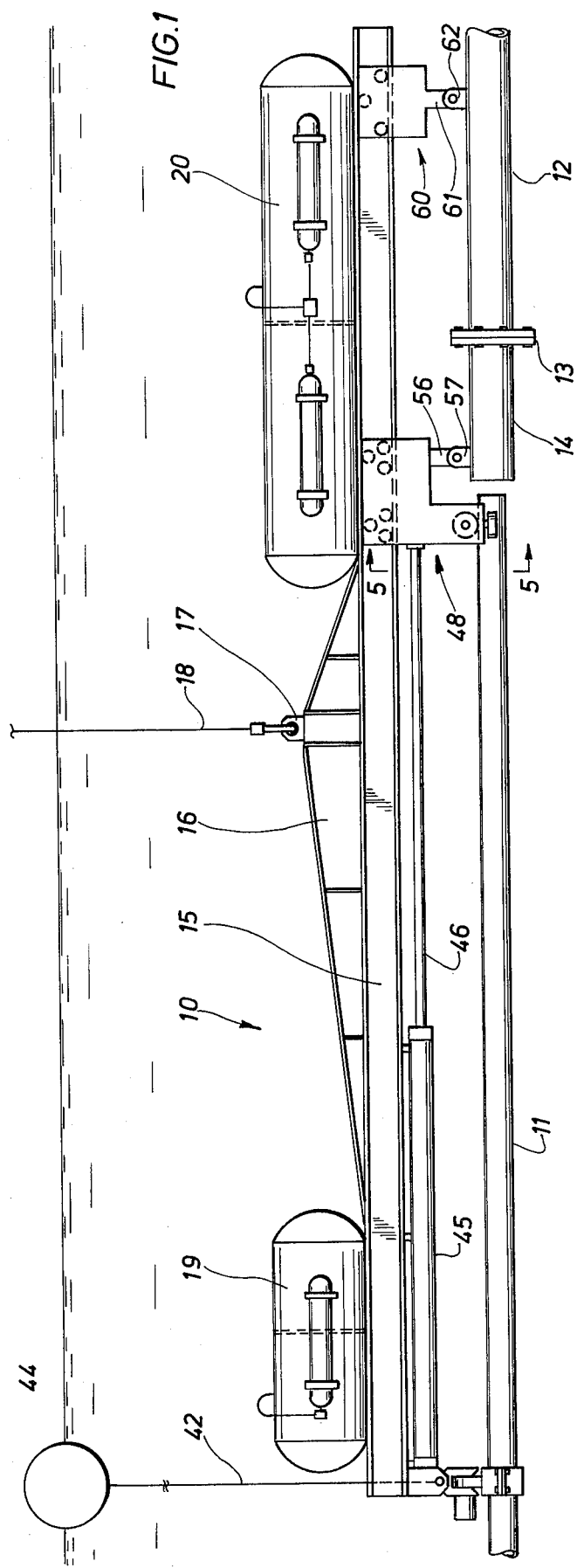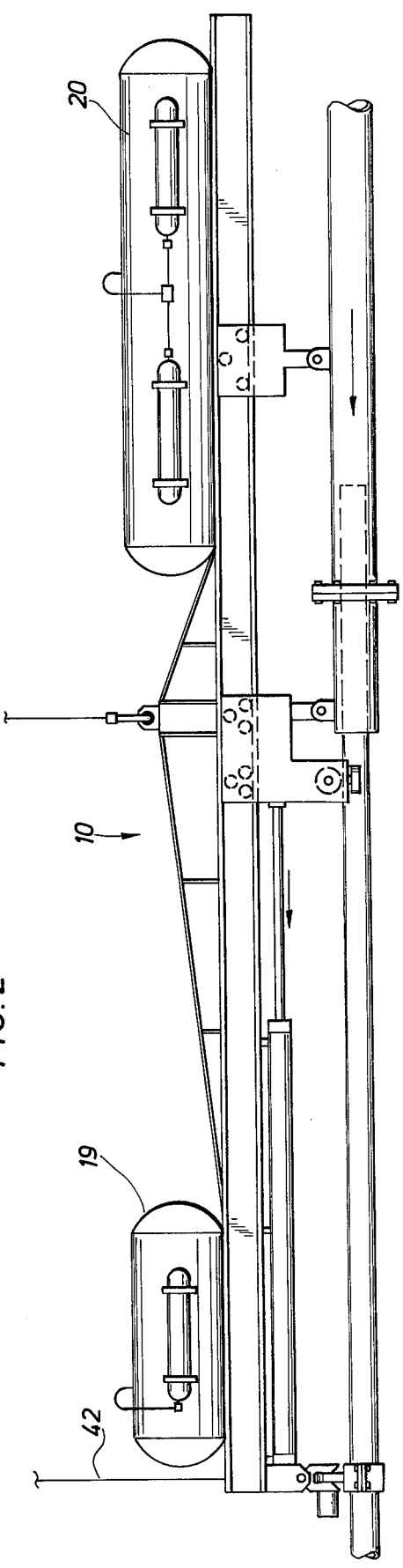

UNDERWATER PIPELINE COUPLING APPARATUS

BACKGROUND OF THE INVENTION

In the assembly of pipelines underwater, a substantial portion of the work must be done by divers. Divers can only work under certain conditions and any variation therefrom forces a delay. For instances, divers cannot work underwater at certain depths. They cannot work underwater when the surface is unduly stormy.

The apparatus of the present invention thus enables the connection of a pair of pipes under the most adverse conditions. In particular, it is able to align the pipe prior to joinder of two sections of pipe. This avoids canting or mispositioning of the two pipes.

SUMMARY OF THE DISCLOSURE

This embodiment is an underwater pipe alignment apparatus. The pipe alignment apparatus incorporates an elongate frame member which is preferably formed out of I-beam stock to have a pair of lengthwise flanges. It is raised and lowered by means of flotation tanks selectively floodable and attached to the frame member. At one end, a pivoted connective clevis is supported and pins a first pipe to the framework. Beneath the framework, a traveling carriage is suspended. The traveling carriage includes a pin and clevis mechanism which connects with the second pipe. The two pipes are pulled together by a traveling carriage carried on rollers which are engaged with the flanges of the frame member. The traveling carriage is moved to and fro along the framework by means of a hydraulic cylinder and piston arrangement which extends parallel to it and just below it. When the traveling carriage moves, it carries with it one of the two pipes and aligns the other with the first, thereby shoving the two together to complete the joint. At that juncture, it can be disconnected from the pipes. Proper alignment is achieved by three pivotal connections between the tool of the present invention and the two pipes.

DESCRIPTION OF THE DRAWINGS

FIG. 1 is a side view of the alignment tool of the present invention underwater for aligning first and second pipes to be coupled together in telescoping fashion;

FIG. 2 is a view very similar to FIG. 1 showing movement of the alignment tool to bring the pipes into concentric arrangement telescoped one over the other;

DESCRIPTION OF THE PREFERRED EMBODIMENT

Figure 3:
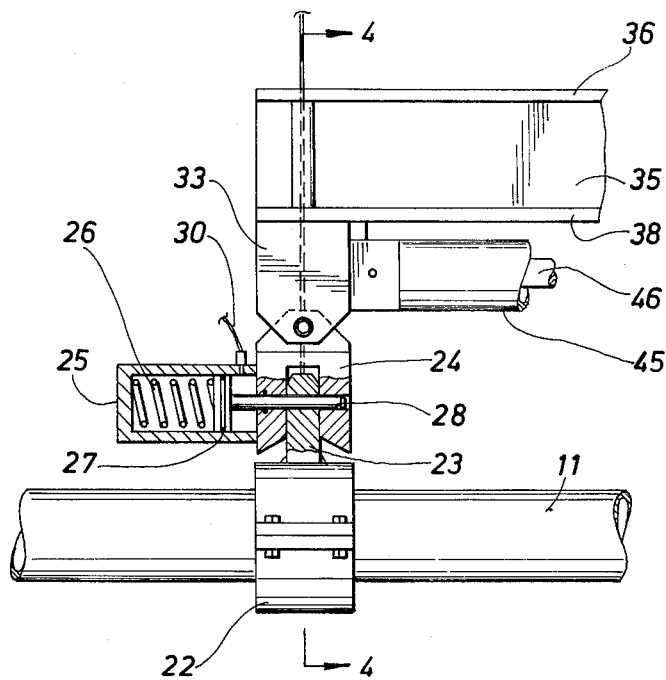
FIG. 3 is an enlarged detailed view of a releasable pin operated pipe connector found at one end of the alignment tool.

In FIG. 1, an alignment tool is indicated generally by the numeral 10 for connecting a first pipe 11 with a second pipe 12. The pipe 12 is joined at a set of flange plates 13 to a pipe coupling 14. One such pipe coupling is illustrated in U.S. Pat. No. 3,784,234 or application Ser. No. 544,051. The alignment tool 10 includes a major frame member 15. It is constructed in the form of an I-beam of substantial length. The I-beam 15 has a reinforcing spine 16 appended to the top side which terminates at an eyelet 17. The eyelet 17 is readily engaged with a support line 18 for lowering the apparatus into the water.

The frame member 15 supports a first flotation tank 19 and a second flotation tank 20. The tanks 19 and 20 are at opposite ends of the equipment. The tanks are preferably similar in construction and differ only in size. Each tank preferably stores a selected volume of compressed air. By means of a valve, air is released from each tank and water is flooded into each. When this occurs, the water forces most of the air out of the tank and partially or fully fills it to alter the buoyancy of the alignment tool 10. The alignment tool is selectively flooded and lowered by adjustment of the valves which admit water to the tanks 19 and 20. At the surface, the tanks 19 and 20 are controllably flooded to create negative buoyancy, causing the alignment tool 10 to sink. They are preferably partly flooded to reduce the weight on the cable 18. They are flooded in a balanced manner to avoid tipping one end or the other of the alignment tool. This enables it to sink primarily in the horizontal plane.

Figure 4:
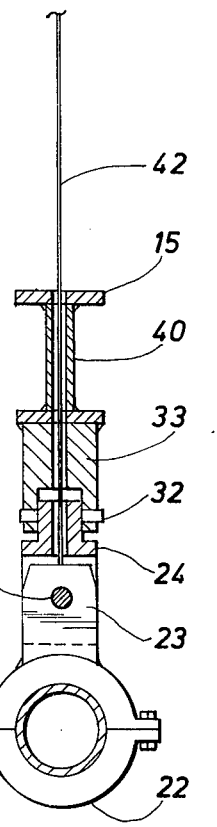
FIG. 4 is a sectional view along the line 4—4 of FIG. 3 illustrating details of construction of the connective apparatus shown therein.

The alignment tool itself includes the frame member 15 which is shown in cross sectional view in FIG. 4 to incorporate an I-beam with flange plates at the top and bottom wich extend to the right and left. This provides structural integrity against twisting or bending. In addition, it enables the major frame member 15 to serve as a guide for certain apparatus to be described.

Continuing with the description, the left side pipe 11 is shown in FIG. 3. A fixed collar 22 is positioned around it and has an upwardly directed tab 23. The tab 23 is perforated. A clevis 24 fits about the tab 23. The clevis supports on one side a closed cylinder 25. The coil spring 26 in the cylinder 25 forces a piston 27 to the right of FIG. 3. The piston 27 moves a piston rod 28. The rod 28 extends through the clevis 24, and passes through the tab 23 which is perforated at the center. The sectional view of FIG. 3 shows the piston rod 28 extending into the far side of the clevis. A fluid line 30 introduces fluid under pressure to force the piston 27 to the left. The piston 27 is forced to the left to retract the pin prior to connection of the tab to the clevis. After alignment is achieved, the fluid pressure is dropped, and the piston 27 is then forced to the right.

The tab 23 is chamfered along the top edges. The clevis is tapered on the two lower faces to serve as a funnel directing the clevis to the position where it straddles the tab. This enables the two to move together smoothly. When fluid pressure is introduced in the line 30, the piston 27 is forced to the left thereby opening the clevis for connection with the tab and of course, the piston rod 28 moves to the right to pin the tab to the clevis.

The clevis 24 is shown in sectional view in FIG. 4 of the drawings to be pivotally supported by first and second pins 32. The pins 32 are received through appropriate openings in a fixed protruding lug 33 on the lower side of the frame member 15. The lug 33 is welded to the frame member 15 and extends downwardly. The frame member itself incorporates a central webbing 35 shown in FIG. 3 between an upper flange plate 36 and a lower flange plate 38. The webbing plate 35 between the flanges has a specified thickness but it is somewhat larger at 40 to accommodate a vertical tubular member which is hollow and which opens a passage from top to bottom. As shown in FIG. 4 of the drawings, the hollow tubular member 40 enables a line 42 to pass all the way through the frame member 15 and the protruding lug 33 on the lower side. The clevis itself is spaced apart from the lug, and it is hollow also. This defines a vertical passage through all of the equipment for the flexible line 42. The line 42 is preferably welded to the tab 23. It extends to the surface. Its specific location is indicated at all points in time a floating buoy 44 shown in FIG. 1 of the drawings. At the time that the alignment tool 10 is placed in the water, the bouy 44 is temporarily disconnected from the flexible line 42. The line is threaded through all of the openings shown in FIG. 4 so that it extends through the alignment tool 10. When the alignment tool 10 is lowered in the water, the cable 42 guides it as it travels downwardly.

As will be observed, the cable 42 causes the alignment tool to be lowered to the near vicinity of the pipe 11. The fluid line 30 extends to the surface. At the surface, it is readily available to permit fluid pressure to introduced in the line sufficient to overcome the force of the spring 26 to retract the pin 28 from the illustrated position of FIG. 3. When that pressure is relaxed the alignment tool is pinned to the pipe 11.

The protruding lug 33 serves as a base support for a hydraulic cylinder 45. The hydraulic cylinder has a piston in it which is preferably double acting by the introduction of pressure fluid on either face, and it extends a piston rod 46. The length of the cylinder is fairly long and hence, the rod 46 is quite long. The cylinder itself is shown supported at two or three places beneath the frame member 15. It is beneath and parallel to the frame member. The piston rod 46 connects to a traveling carriage 48 shown in the drawings. The traveling carriage travels on the frame member 15. This is better illustrated in FIG. 5 of the drawings where the traveling carriage 48 is illustrated to include a pair of symmetrical side walls 49. The sidewalls 49 support a number of short axles which in turn support the guide rollers 50. Preferably, two rollers are positioned against the lower flange plate 38 while only one need be positioned against the upper flange plate 36. Through the use of three rollers, the traveling carriage is fixed in relative position and does not rock to and fro as viewed in FIGS. 1 and 2. As viewed in FIG. 5 of the drawings, duplicate sets of the rollers are appended to the left and right frame plates 49. The plates 49 are joined together by a transverse frame member 51. The several rollers are contacted against the flange plates and, being duplicated on both sides, prevent wobble to the right and left as viewed in FIG. 5. The traveling carriage is thus of substantial construction. The piston rod 46 conveniently connects to the transverse frame member 51 shown in FIG. 5.

Figure 5:
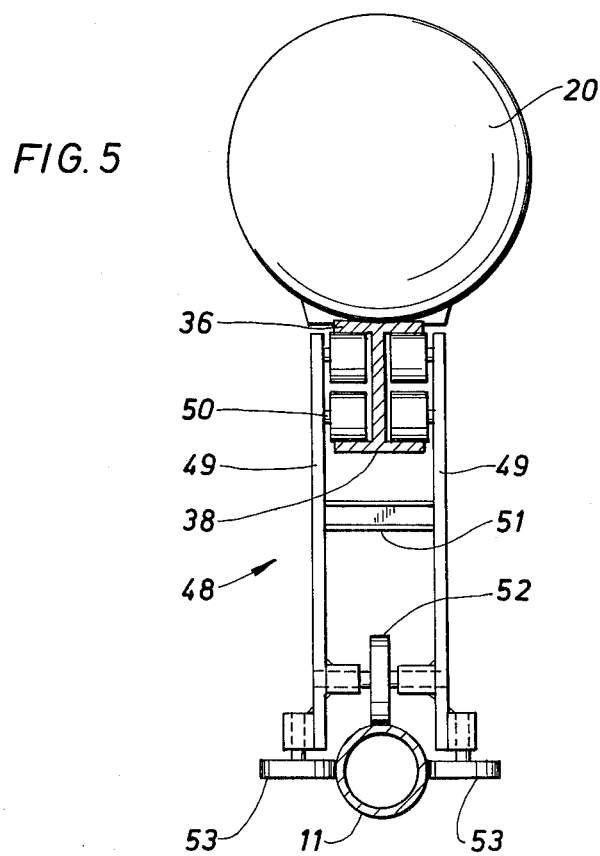
FIG. 5 is an end view of the traveling carriage showing wheels aligning it with the flanges of the elongate frame member of the alignment tool.

The pipe 11 is below the traveling carriage. The traveling carriage supports a first guide roller 52. The guide roller 52 is in a plane parallel to the side members 49 as shown in FIG. 5. In addition, each side member supports a guide roller 53. The rollers contact the pipe 11 at the top and on the sides. This aligns the traveling carriage on the pipe 11. It will be observed that all of the rollers are free wheeling and are supported by short stub axles which are received in bushings supported on the traveling carriage. The rollers collectively guide the traveling carriage on the pipe 11.

In FIG. 1 of the drawings, the traveling carriage 48 additionally includes a downwardly protruding tab 56. The tab 56 is pin connected to a clevis 57 on the top of the coupling 14. The length of the tab 56 locates the coupling 14 so that it is axially coincident with the pipe 11.

A traveling carriage 60 is shown in FIG. 1 of the drawings at the right hand extreme end of the alignment tool 10. The traveling carriage 60 incorporates a set of three wheels which engage the flange plates 36 and 38. They are arranged in a triangle just as the wheels on the traveling carriage 48. Perfect alignment of the carriage 60 is not so critical. Accordingly, it is preferably provided with six rollers which guide it. By contrast, the traveling carriage 48 is equipped with twelve rollers. The carriage 60 has a downwardly protruding tab 61 which is pin connected to a protruding clevis 62 attached to the pipe 12.

In operation, the pipe 12 is connected to the coupling 14. Typically, the pipe 12 can be floated on the surface by buoys. It is connected to the free moving carriage 60 and the hydraulically moved carriage 48. These connections can be easily carried out at the surface. The cable 42 is aligned with the tool 10. It is able to guide the alignment tool 10 through the water to the pipe 11. The alignment tool 10 is adjusted in buoyancy to be slightly negative so that it will sink gradually. It is then lowered in the water on the cable 18. As it settles, the pipe 12 settles towards the bottom. The pipe 12 is controllably sunk by techniques currently in use. As the pipe 12 is sunk, the alignment tool 10 settles toward the pipe 11. When it arrives the application of pressure fluid through the line 30 opens the pin so that the tab is connected to the alignment tool. When this occurs, the pipe 11 is prepared for insertion into the coupling 14. The buoyant tanks 19 and 20 level the alignment tool 10. This carries the rollers 52 and 53 on the traveling carriage 48 into contact with the pipe 11. When this occurs, the rollers contact the pipe 11 and position it. When the pipe 11 is positioned in the traveling carriage, the traveling carriage (beginning from the extended position) is retracted or pulled to the left of FIG. 1. When the hydraulic cylinder 45 is operated, the carriage 48 moves to the left of FIG. 1 of the drawings. This is shown in FIG. 2 of the drawings. As it moves to the left, it pulls the coupling 14 over the pipe 11. When this occurs, the coupling is made fast on the pipe 11 and connects to it in the customary manner. It is shown in dotted line position in FIG. 2 substantially in the coupling 14. This completes connection of all of the equipment.

At this point it is necessary to disconnect the equipment. The alignment tool 10 is connected to the joined pipes 11 and 12 by three pipes. The apparatus shown in FIG. 3 is provided with pressure in the line 30 which retracts the pin. The same equipment can be used to release the pin connected to the pipe 12 and the coupling 14. This then frees the alignment tool 10 to float to the surface. It is impossible to maintain a slight negative buoyancy with the pipe 12 connected to the alignment tool. After it has been released this reduces the total weight on the alignment tool, the tanks 19 and 20 float the tool to the surface. Even if this is not accomplished, the tool is easily retrieved on the cable 18. It will travel upwardly in part guided by the cable 42. Once it has been retrieved at the surface, the cable 42 can be cut or it can be left connected to the buoy 44 as a marker.

The foregoing is directed to the preferred embodiment but the scope thereof is determined by the claims which follow.

I claim:

1. An apparatus for achieving underwater connection of a first pipe which is telescoped into a second pipe, comprising:
    an elongate frame member;
    means for releasably clamping said frame member parallel to a first pipe;
    second means for clamping said elongate frame member relative to a second pipe, the first and second pipes being parallel to one another and axially spaced apart;
    moving means carried on said elongate frame member and connected between said first and second clamp means for pulling one of said clamp means toward the other to move the first and second pipes toward one another and telescoping connection with one another.

2. The apparatus of claim 1 wherein said moving means comprises an elongate fluid motor having travel between first and second positions which are axially aligned with one another and are parallel to said frame member, said traveling means being located on the lower side of sad frame member.

3. The apparatus of claim 1 wherein said first clamp means incorporates a downwardly facing clevis and a pin insertable through a pair of openings in said clevis to connect with a lug carried on the pipe;
    means for remotely inserting and removing said pin into the openings of said clevis;
    and a pivot means for supporting clevis below said frame member.

4. The apparatus of claim 1 wherein one of said clamp means is carried on a traveling carriage which traveling carriage moves on protruding flanges of said frame member, and said moving means incorporates an elongate hydraulic cylinder having a protruding piston rod which is connected to said traveling carriage for moving said traveling carriage along said frame member.

5. The apparatus of claim 4 including selectively floodable air tanks appended to said frame member for controlling the buoyancy thereof; and
    a support means for supporting said frame member by means of a cable extending beneath the surface of a body of water.

6. The apparatus of claim 5 wherein one of said clamp means includes a freely movable traveling carriage supported by protruding flange plates of said elongate frame member.

7. The apparatus of claim 6 wherein said free moving traveling carriage includes right and left wheels engaging respectively right and left flange plates on said elongate frame members.

8. The apparatus of claim 6 further including a second movable traveling carriage supported by the flange plates of said frame member, and an elongate fluid motor connected thereto for extending and retracting to move said second movable traveling carriage.

9. The apparatus of claim 8 including means for mounting said fluid motor parallel and beneath said frame member.

10. The apparatus of claim 9 including an elongate piston rod extending from said fluid motor and connected to said second traveling carriage.

* * * * *